May 5, 1964  R. G. LE TOURNEAU  3,131,493
POWER SHOVEL MACHINE
Filed June 1, 1962  2 Sheets-Sheet 1

INVENTOR.
Robert G. LeTourneau
BY
Wm. T. Wofford
Attorney

May 5, 1964  R. G. LE TOURNEAU  3,131,493
POWER SHOVEL MACHINE

Filed June 1, 1962  2 Sheets-Sheet 2

INVENTOR.
Robert G. LeTourneau
BY
Wm. T. Wofford
Attorney

United States Patent Office 3,131,493
Patented May 5, 1964

3,131,493
POWER SHOVEL MACHINE
Robert G. LeTourneau, P.O. Box 2307, Longview, Tex.
Filed June 1, 1962, Ser. No. 199,457
3 Claims. (Cl. 37—124)

My invention relates generally to power shovel machines, and more particularly to self-propelled machines having a short lever shovel mounted for action at one end thereof.

The general object of my invention is to provide an improved self-propelled short lever shovel machine.

Another object of the invention is to provide a self-propelled short lever shovel machine incorporating improved shovel manipulating mechanism.

Another object of the invention is to provide a short lever shovel machine capable of improved "crowding" action when digging.

These and other objects are effected by my invention as will be apparent from the accompanying drawings, forming a part of this application, in which.

Figures 1, 2:
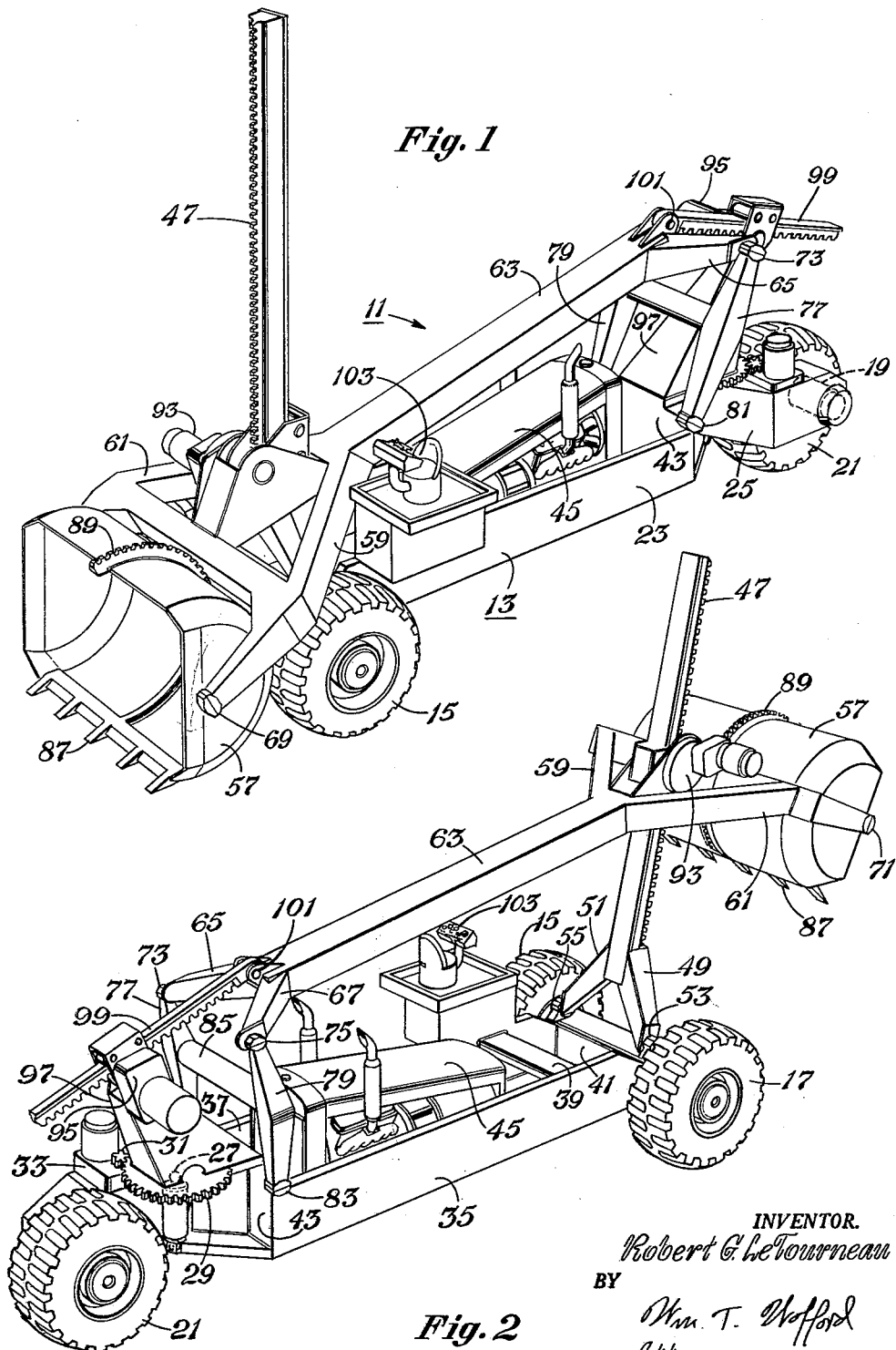
FIG. 1 is a schematic perspective view of a short lever shovel machine, as viewed from the left side, in accordance with a preferred embodiment of my invention.
FIG. 2 is a schematic perspective view of the machine of FIG. 1 as viewed from the right side.

Referring now to the drawings, FIG. 1 illustrates a short lever shovel, or digger machine 11 including an articulated frame structure 13 supported at the front end by an axle (not shown) and a pair of wheels 15, 17, and at the rear end by an axle 19 and a single wheel 21. The articulated frame 13 is composed of a front main frame portion 23 which is connected to a rear portion 25, preferably, by means of a pair of vertically disposed balls 27, attached to the rear portion 25, which cooperate with a pair of sockets (not shown) attached to the front portion 23. A circular gear 29 is fixed to the front portion 23, and is in steering engagement with a pinion 31 driven by a gear reduction 33 which is attached to the rear portion 25.

The front portion 23 of the frame includes a pair of side girders 35, 37, which are maintained in fixed spaced parallel relation by a transverse strut 39 and closure members 41, 43 at the ends thereof. A suitable source of electric power 45, such as an internal combustion engine driving an electric generator, is disposed between the side girders 35, 37 as shown.

A rack structure 47 is disposed to pivot in the center longitudinal plane of the machine 11 about a pair of trunnions (not shown) which are affixed to the ends of a pair of yoke arms 49, 51 attached to one end of the rack. The trunnions are supported by a pair of cooperative bearings 53, 55 affixed to the front end of the frame front portion 23.

A shovel 57 is supported by a pair of yoke arms 59, 61 which are merged with the front end of a push beam 63. This beam extends rearwardly to near the machine end, where it merges with a pair of yoke arms 65, 67. The front yoke arms 59, 61 are suitably journaled at 69, 71 to stub shafts (not shown) fixed to opposite sides of the shovel. The free ends of the yoke arms 65, 67 are journaled at 73, 75 to the upper ends of a rocker assembly composed of a pair of rocker arms 77, 79 and a strut 85. The lower end of each rocker arm 77, 79 is pivoted at 81, 83 to the frame side girders 37, 35 respectively. The strut 85 is disposed between a pair of opposed surfaces of rocker arms 77, 79 and maintains them in fixed spaced relation.

The shovel 57 is illustrated as being substantially hemi-cylindrical, but, of course, any other suitable arcuate trough-like shape may be employed. Along one longitudinal edge of the shovel 57, there is a plurality of sharpened, chisel-shaped teeth 87. An arcuate rack 89 is also affixed to the exterior surface of the shovel so that the teeth of the rack project radially outward. A gear motor reduction 91 is disposed between and fixed relative to the yoke arms 59, 61 and has an output pinion 92 engaging the rack 89 so as to rotate the shovel 57. Another gear motor reduction 93 is disposed between and fixed relative to the yoke arms 59, 61 and has an output pinion 94 engaging the rack 47 to raise and lower the shovel 57 thereon. Yet another gear motor reduction 95 is supported on a suitable foundation 97 attached to the rear end of the frame front portion and has an output pinion 98 engaging a rear rack 99 which is pivotally connected, as at 101, to the rear end of the push beam 63.

An operator's control station 103 is provided along one side of the machine near the front end. Preferably, the control station is elevated so as to provide the operator with a clear view of the shovel while in operation.

Figure 3:
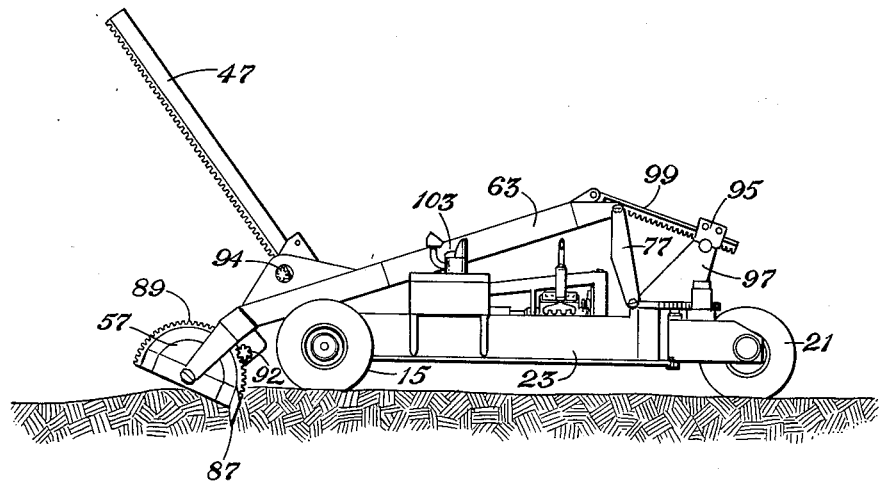
FIG. 3 is a schematic elevational view of the machine of FIG. 1 in one operative position.
Figure 4:
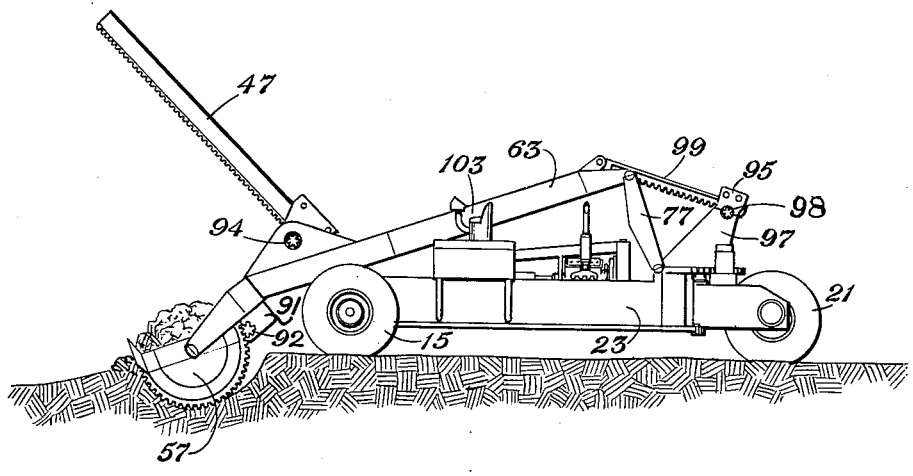
FIG. 4 is a schematic elevational view of the machine of FIG. 1 in another operative position.

In order to describe the manner in which the machine is used, reference may be made to FIGS. 3 and 4. With the machine positioned in the area to be excavated, the shovel 57 is moved to the lower region of the rack 47 which is tilted forward of vertical. The shovel is then rotated to engage the teeth 87 in the earth in approximately the position shown. Contemporaneously, the shovel is rotated on its axis by means of the gear motor reduction 91 and the push beam 63 is moved forward by means of the rack and gear motor reduction 99, 95. Thus, the combination of the forward movement of the push beam and the rotation of the shovel 57 causes the shovel to "crowd" the work. The crowding of the shovel results in more effective digging action of the shovel for each rotation thereof. When loaded, as shown in FIG. 4, the push beam is moved rearwardly while, at the same time, the shovel is raised on the rack 47. Whereupon, a truck or other vehicle of sufficient capacity to receive a shovel load is conveniently located under the shovel. By means of the gear motor reduction 91, the shovel may be rotated to discharge its load under controlled conditions, with a minimum of damage to the receiving vehicle.

It will be evident to those skilled in the art that the short lever shovel machine of the present invention may be used effectively for both excavating and loading operations. Further, it is evident that the shovel manipulating mechanism, while simple and rugged, provides very effective and efficient shovel action for digging as well as loading and unloading operations.

While I have shown my invention in only one form, it will be obvious to those skilled in the art that it is not so limited, but is susceptible of various changes and modifications without departing from the spirit thereof.

I claim:

1. A power shovel machine comprising an elongate main frame supported on front and rear wheel and axle assemblies; a shovel in the form of an arcuate trough having end closures and a plurality of digger teeth projecting outwardly from one side of said trough; an elongated first rack pivotally connected at one end to said main frame adjacent the front end thereof so as to provide for swinging motion in a vertical plane; a push beam extending generally longitudinally of said main frame and having a first yoke at the front end thereof and a second yoke at the rear end thereof; means journalling said shovel end closures to the respective end portions of said first yoke for rotation about a horizontal axis; first gear reduction means fixed to said first yoke and having an output pinion engaging said first rack; a pair of arm members pivotally fixed at one end to respective ends of said second yoke and pivotally connected at the other end to said main frame adjacent the rear end thereof; a second rack pivotally fixed to said second yoke and extending rearwardly therefrom; second gear reduction means fixed to said main frame and having an output pinion engaging said second rack; an arcuate rack fixed to the outer periphery of said shovel; and third gear reduction means fixed to said first yoke and having an output pinion engaging said arcuate rack.

2. In combination with a digging and loading machine having a frame supported by front and rear wheel and axle assemblies: a shovel having a ground engageable edge; a pair of shafts outwardly extending from said shovel and establishing an axis of rotation thereabout; an elongated first rack pivotally connected to said frame adjacent the front end thereof; a beam extending in the direction longitudinally of said frame and having a first yoke at one end embracing and supported on said first rack and engaging said shafts in a rotatable supporting relation, said beam having at the other end thereof a second yoke; a pair of arms each pivotally connected at one end to a respective arm of said second yoke and at the other end to said frame adjacent said rear wheel and axle assembly; means to move said beam longitudinally of said frame; means to move said beam longitudinally of said rack, and means for rotating said shovel about said axis.

3. In combination with a power shovel machine comprising an elongate main frame supported on front and rear wheel and axle assemblies: a shovel manipulating mechanism in the form of a linkage assembly mounted for pivoting motion about horizontal axes, said linkage assembly including a first member extending generally longitudinally of and above said main frame and having a forward end extending beyond the front end of said main frame; a second member pivoted at one end on said main frame adjacent the rear end thereof and pivoted at the other end to the rear end of said first member; a third member pivoted at one end to said main frame adjacent the front end thereof and extending upwardly beyond said first member; means coupling said first member to said third member for powered movement longitudinally of said third member; a shovel in the form of an arcuate trough having a ground engageable cutting edge; means pivotally fixing said shovel to the forward end of said first member for rotation about a horizontal axis; power means for rotating said shovel about said axis; and power means for moving said first member longitudinally of said main frame.

References Cited in the file of this patent

UNITED STATES PATENTS

| | | |
|---|---|---|
| 1,162,607 | Hoar | Nov. 30, 1915 |
| 1,256,401 | Ward | Feb. 12, 1918 |
| 1,526,830 | Byrne | Feb. 17, 1925 |
| 2,538,000 | Hoar et al. | Jan. 16, 1951 |
| 2,820,555 | Lessmann | Jan. 21, 1958 |